(12) United States Patent
Lang

(10) Patent No.: US 7,717,659 B2
(45) Date of Patent: May 18, 2010

(54) ZERO-CLEARANCE BOLTED JOINT

(75) Inventor: Benjamin N. Lang, Flushing, MI (US)

(73) Assignee: Acumet Intellectual Properties, LLC, Troy, MI (US)

( * ) Notice: Subject to any disclaimer, the term of this patent is extended or adjusted under 35 U.S.C. 154(b) by 204 days.

(21) Appl. No.: 11/462,433

(22) Filed: Aug. 4, 2006

(65) Prior Publication Data

US 2007/0036635 A1    Feb. 15, 2007

Related U.S. Application Data

(60) Provisional application No. 60/708,265, filed on Aug. 15, 2005.

(51) Int. Cl.
- F16B 43/00 (2006.01)
- F16B 19/00 (2006.01)
- F16B 21/00 (2006.01)
- F16B 21/18 (2006.01)

(52) U.S. Cl. .................. 411/533; 411/360; 411/346; 411/517; 411/969

(58) Field of Classification Search .............. 411/533, 411/360, 367, 354, 346–347, 65, 517, 541, 411/969, 186–187, 265, 339, 82–82.5, 914
See application file for complete search history.

(56) References Cited

U.S. PATENT DOCUMENTS

| | | | | |
|---|---|---|---|---|
| 1,968,516 A | * | 7/1934 | Dieter | 411/399 |
| 1,996,128 A | * | 4/1935 | Thomson | 411/27 |
| 2,548,840 A | * | 4/1951 | Eksergian | 301/6.1 |
| 3,298,725 A | * | 1/1967 | Boteler | 403/282 |
| 3,418,869 A | * | 12/1968 | Herpich | 74/569 |
| 3,456,972 A | * | 7/1969 | Drotar | 403/408.1 |
| 3,603,626 A | * | 9/1971 | Whiteside | 403/408.1 |
| 4,046,054 A | * | 9/1977 | Gulistan | 411/15 |
| 4,048,898 A | * | 9/1977 | Salter | 411/44 |
| 4,236,562 A | * | 12/1980 | Molina | 411/103 |
| 4,238,165 A | * | 12/1980 | Wagner | 403/408.1 |
| 4,435,112 A | * | 3/1984 | Becker | 411/368 |
| 4,974,989 A | * | 12/1990 | Salter | 403/408.1 |
| 5,426,130 A | * | 6/1995 | Thurber et al. | 522/14 |
| 5,980,174 A | * | 11/1999 | Gallagher et al. | 411/55 |
| 2001/0051080 A1 | * | 12/2001 | Godsted et al. | 411/82.2 |

* cited by examiner

Primary Examiner—Victor Batson
Assistant Examiner—David Reese
(74) Attorney, Agent, or Firm—Trexler, Bushnell, Giangiorgi, Blackstone & Marr, Ltd.

(57) ABSTRACT

A bolted joint which is formed by using a bolt having a tapered shoulder to cold form a deformable sleeve in order to provide a "zero-clearance" fit. Specifically, preferably a plurality of bolted joints are used to join a ring gear to a differential case. As the bolts are installed into the differential case and ring gear, tapered shoulders on the bolts dilate deformable sleeves until outer diameters of the sleeves contact internal walls of through holes in the differential case.

29 Claims, 7 Drawing Sheets

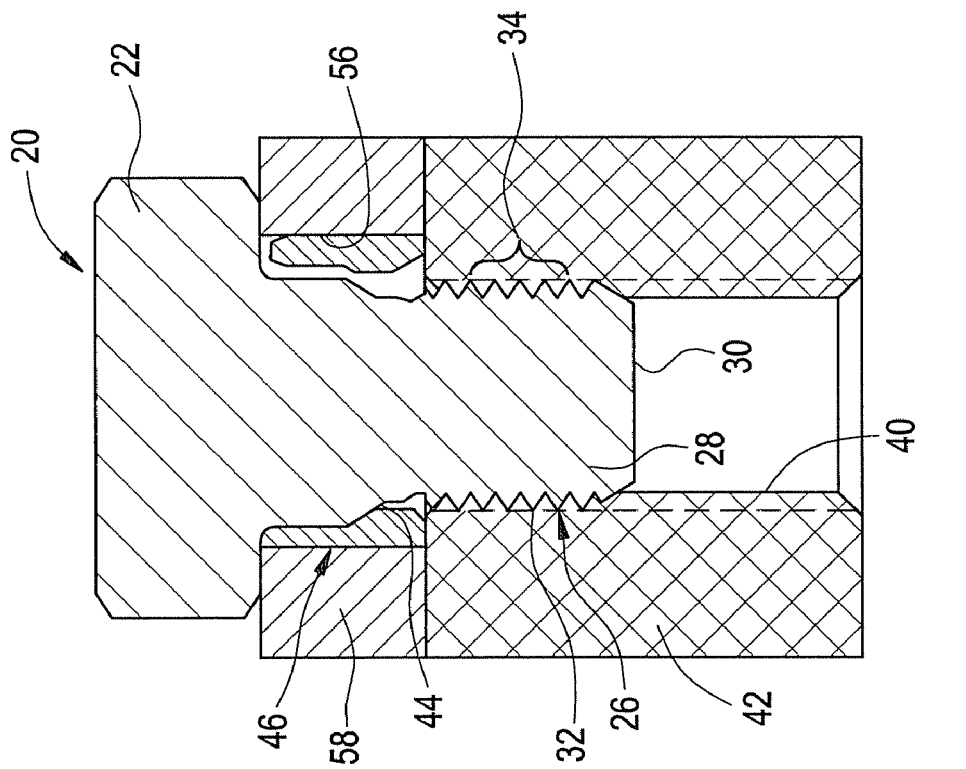

ZERO-CLEARANCE BOLTED JOINT

RELATED APPLICATION (PRIORITY CLAIM)

This application claims the benefit of U.S. Provisional Application Ser. No. 60/708,265, filed Aug. 15, 2005, which is hereby incorporated herein by reference in its entirety.

BACKGROUND

The present application generally relates to bolted joints, and more specifically relates to a zero-clearance bolted joint such as for use in joining a ring gear to a differential case.

One application in which bolted joints have been attempted to be used is in joining a ring gear to a differential case. However, generally the bolted joints are not capable of keeping the gear from moving in relation to the differential case. This is because the bolts are not capable of producing enough tension to keep the gear from slipping which in turn causes the bolts to back out of the joint.

One current method of joining a ring gear to a differential case utilizes matching circular patterns of a plurality of through holes on the differential case and a plurality of tapped holes on the ring gear. This design has raised concerns with the hole position tolerance capability of the manufacturing plants. As a result, the challenge is to develop a way of fastening the differential case to the ring gear that will be forgiving of alignment and minimize gear slippage while the ring gear is submitted to a substantial load for a number of cycles.

OBJECTS AND SUMMARY

An object of an embodiment of the present invention is to provide a zero-clearance bolted joint which can be used, for example, to join a ring gear to a differential case.

Another object of an embodiment of the present invention is to provide a zero-clearance bolted joint which can be used as a way of fastening a differential case to a ring gear that is forgiving of alignment and minimizes gear slippage while the ring gear is submitted to a substantial load for a number of cycles.

Briefly, and in accordance with at least one of the foregoing objects, an embodiment of the present invention provides a bolted joint which is formed by using a bolt having a tapered shoulder to cold form a deformable sleeve in order to provide a "zero-clearance" fit. Specifically, preferably a plurality of bolted joints are used to join a ring gear to a differential case. As the bolts are installed into the differential case and the ring gear, tapered shoulders on the bolts dilate deformable sleeves until the outer diameters of the sleeves contact internal walls of through holes in the differential case.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a cross-sectional view of a bolted joint which is in accordance with an embodiment of the present invention, showing the condition prior to applying a shear load;

FIG. 2 is similar to FIG. 1, but shows the bolted joint after a shear load has been applied, showing maximum movement between the differential case and ring gear;

DESCRIPTION

Figure 3:
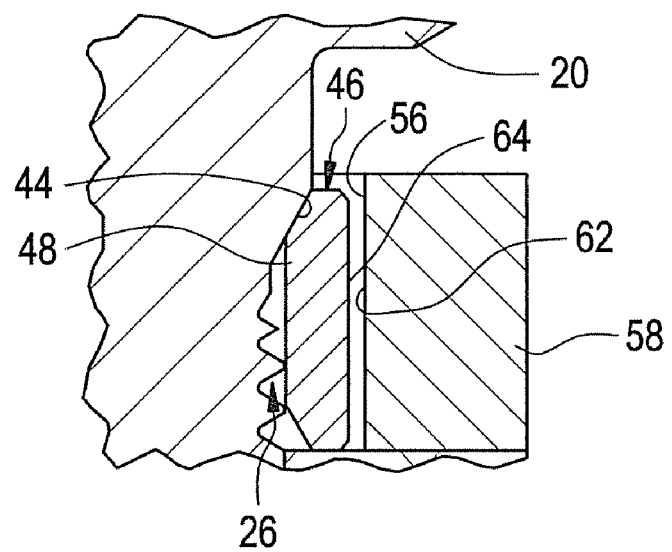
FIG. 3 shows the sleeve before installation of the bolt.

While the present invention may be susceptible to embodiment in different forms, there are shown in the drawings, and herein will be described in detail, embodiments thereof with the understanding that the present description is to be considered an exemplification of the principles of the invention and is not intended to limit the invention to that as illustrated and described herein.

The present invention is directed to a zero-clearance bolted joint which can be used, for example, as a way of fastening a differential case to a ring gear that is forgiving of alignment and minimizes gear slippage while the ring gear is submitted to a substantial load for a number of cycles.

Figure 7:
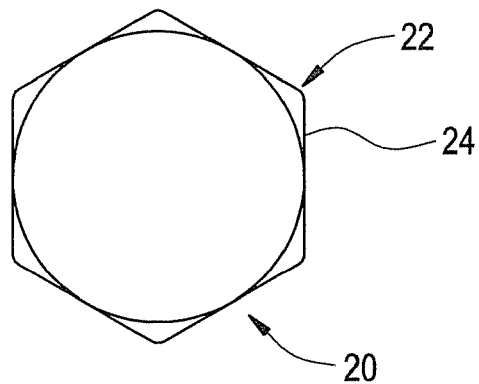
FIG. 7 is a top view of the bolt.

As shown in FIGS. 1 and 2, the bolted joint consists of a bolt 20 having a head 22 which preferably has a hexagon profile 24 as shown in FIG. 7. Of course, the head 22 may have a profile other than hexagon. A threaded portion 26 is provided on a shaft portion 28 of the bolt 20, proximate an opposite end 30 of the bolt 20. An adhesive 32, such as Precoat 80, may be applied to a section 34 of the threaded portion 26 of the bolt 20, such that the adhesive 32 as applied allows for a finger effort start for one revolution after first engagement with the ring gear, as will be described below. As shown in FIGS. 1-4, a tapered shoulder 44 is provided generally between the threaded portion 26 and the head 22 of the bolt 20. With regard to material, the bolt 20 may be formed of, for example, ESS-M1A170-B Grade 8 or 8.2. As will be discussed more fully hereinbelow, the shoulder 44 may instead be provided as rounded (see FIG. 16), and this is actually preferred for reasons discussed later hereinbelow.

Figure 4:
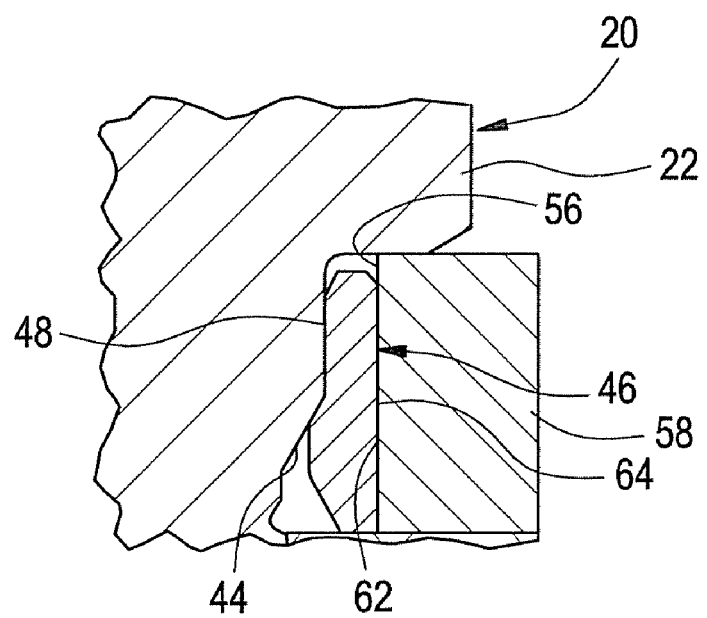
FIG. 4 shows the sleeve after installation of the bolt.
Figure 8:
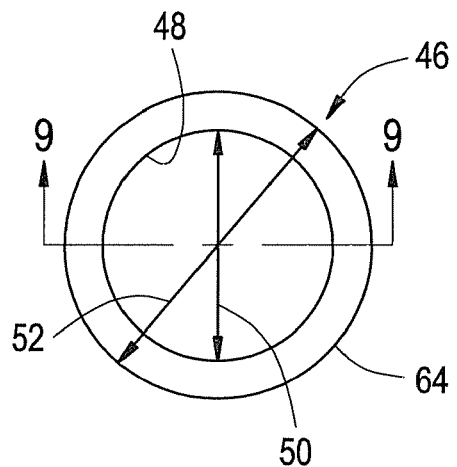
FIG. 8 is a top view of the sleeve.
Figure 9:
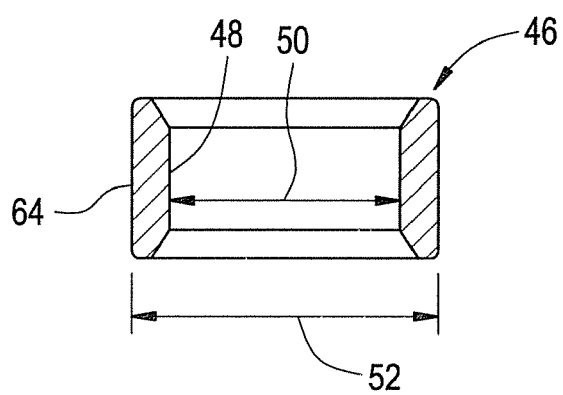
FIG. 9 is a side, cross-sectional view of the sleeve, taken along line 9-9 of FIG. 8.

In addition to the bolt 20, the bolted joint also includes a sleeve 46 as shown in FIGS. 1-4, 8 and 9. As shown in FIGS. 8 and 9, the sleeve 46 is generally circular having a throughbore 48. As such, the sleeve 46 has an inner diameter 50 and an outer diameter 52. Preferably, the inner diameter 50 of the sleeve 46 is smaller than the width or diameter 36 of the shaft portion 28 of the bolt 20, such that the tapered shoulder 44 of the bolt 20 deforms the sleeve 46 when the bolt 20 is installed, i.e., is threadably engaged with the ring gear 42. Preferably, the outer diameter 52 of the sleeve 46 is smaller than a diameter 54 of a corresponding aperture or through hole 56 which is provided in a differential case 58, such that the sleeve 46 can be inserted in the through hole 56 in the differential case 58. Additionally, preferably a diameter 60 of the head portion 22 of the bolt 20 is larger than the diameter 54 of the through hole 56 in the differential case 58. As such, when installed, the head 22 of the bolt 20 seats against the differential case 58, as shown in FIGS. 1, 2 and 4. The sleeve 46 may be formed of, for example, AISI 1010 steel.

Figure 10:
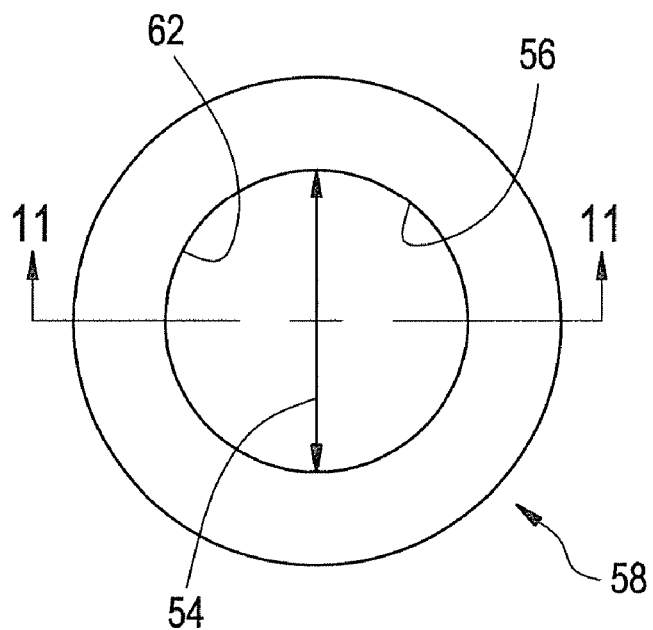
FIG. 10 shows a section of the differential case.
Figure 11:
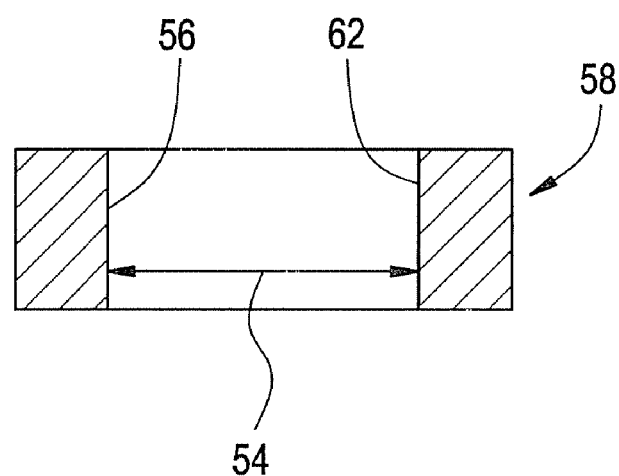
FIG. 11 is a cross-sectional view taken along line 11-11 of FIG. 10.
Figure 12:
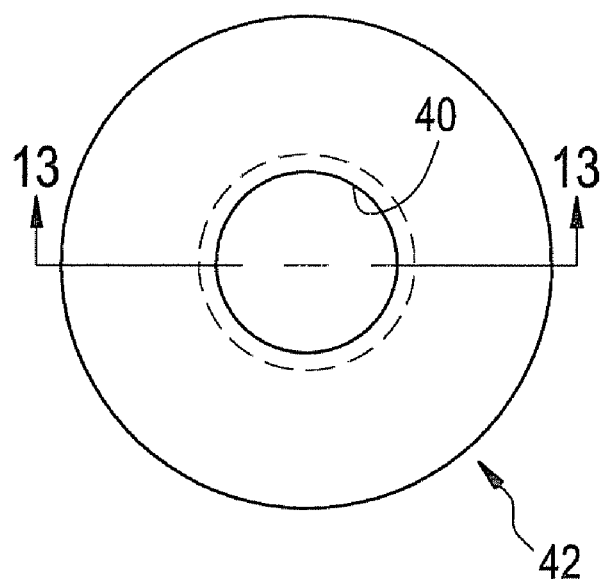
FIG. 12 shows a section of the ring gear.
Figure 13:
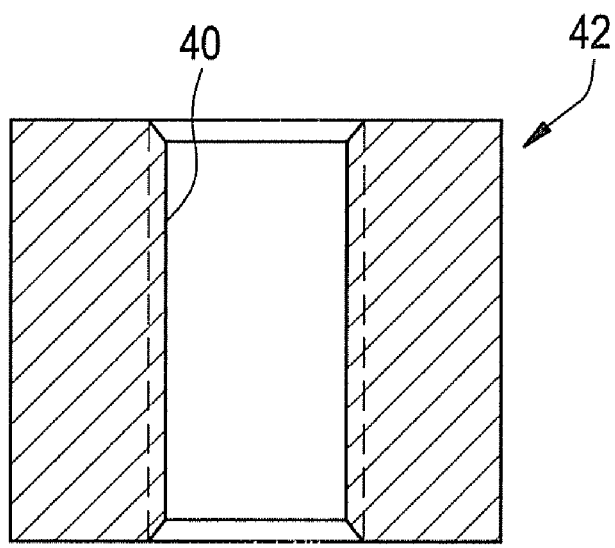
FIG. 13 is a cross-sectional view taken along line 13-13 of FIG. 12.

With regard to the differential case 58, FIG. 10 shows a section of the differential case 58, illustrating the aperture or through hole 56 provided therein. FIG. 11 is a cross-sectional view taken along line 11-11 of FIG. 10. With regard to the ring gear 42, FIG. 12 shows a section of the ring gear 42, illustrating a tapped hole 40 provided therein. FIG. 13 is a cross-sectional view taken along line 13-13 of FIG. 12.

Figure 5:
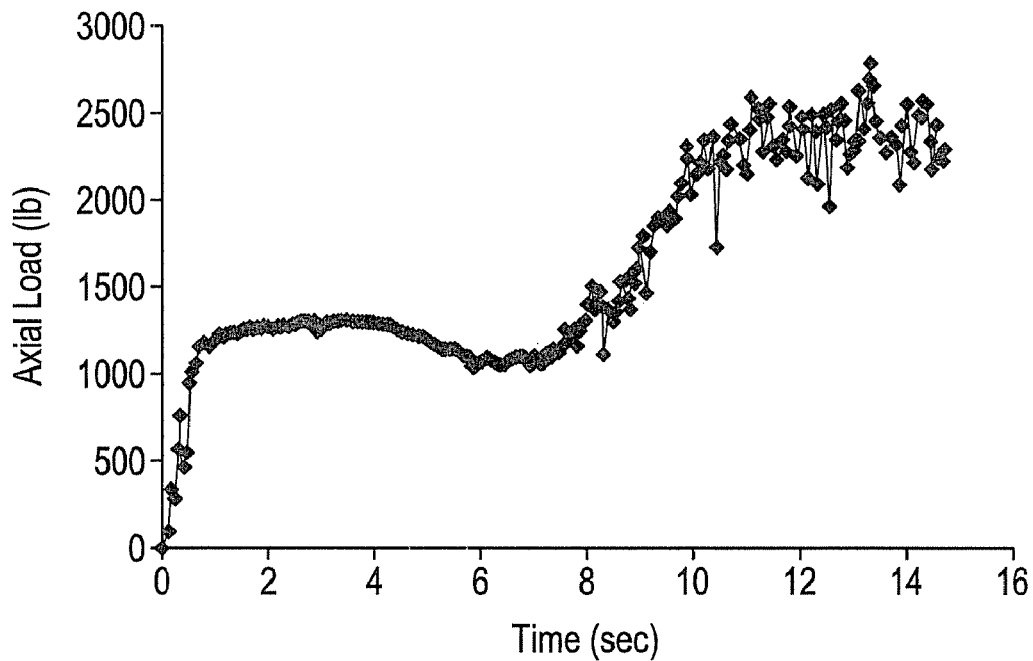
FIG. 5 provides a graph of the tensile load on the bolt vs. time, due to cold forming the sleeve during installation.
Figure 6:
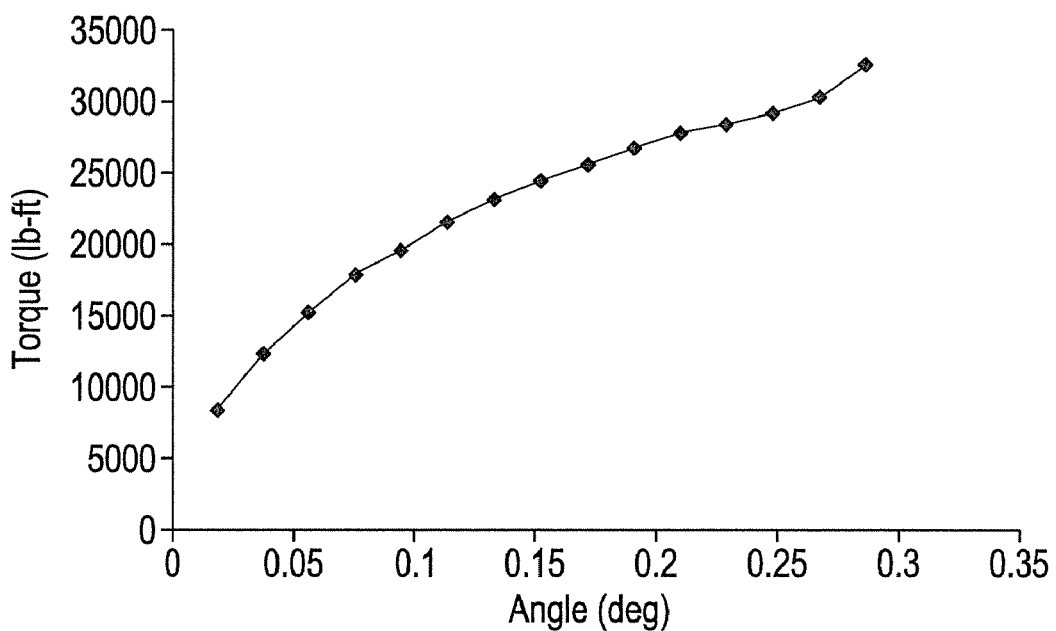
FIG. 6 provides a graph of the torque (in lb-ft) on the ring gear vs. angle of rotation (in degrees) between the ring gear and differential case.

FIG. 3 shows the condition of the sleeve 46 before the bolt 20 is installed. As shown, the shape of the sleeve 46 is consistent with that which is shown in FIG. 9. During installation of the bolt 20, the head 22 of the bolt 20 is rotated causing the threaded portion 26 of the bolt 20 to thread into the tapped hole 40 which is provided in the ring gear 42. As the threaded portion 26 threads into the hole 40, the tapered shoulder 44 of the bolt 20 cold forms the sleeve 46, as shown in FIG. 4 (see also FIGS. 1 and 2), thereby causing the outer surface 64 of the sleeve 46 to contactably engage an internal wall 62 of the differential case 58, thereby providing a "zero-clearance" fit. FIG. 5 provides a graph of the tensile load on the bolt vs. time, due to cold forming the sleeve during installation To fully join the ring gear to the differential case, preferably a plurality of bolted joints are used. FIG. 1 shows the bolted joint prior to applying a shear load, and FIG. 2 shows the bolted joint after a shear load has been applied, showing maximum movement between the differential case 58 and ring gear 42. As shown, while the differential case 58 moves sideways relative to the ring gear 42 and the bolt 20, the bolt 20 and sleeve 46 resist the relative movement between the differential case 58 and the ring gear 42 which additionally reduces the tendency of the bolt 20 to back out of the joint, preferably even when the differential case 58 is submitted to a substantial load for a number of cycles. FIG. 6 provides a graph of the torque (in lb-ft) on the ring gear vs. angle of rotation (in degrees) between the ring gear and differential case.

Figure 14:
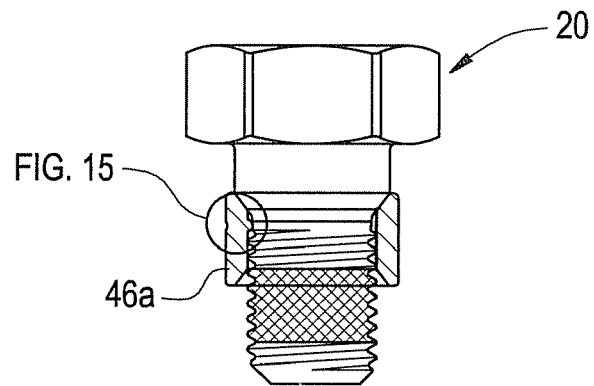
FIG. 14 shows an alternative embodiment which includes a retention feature.
Figure 15:
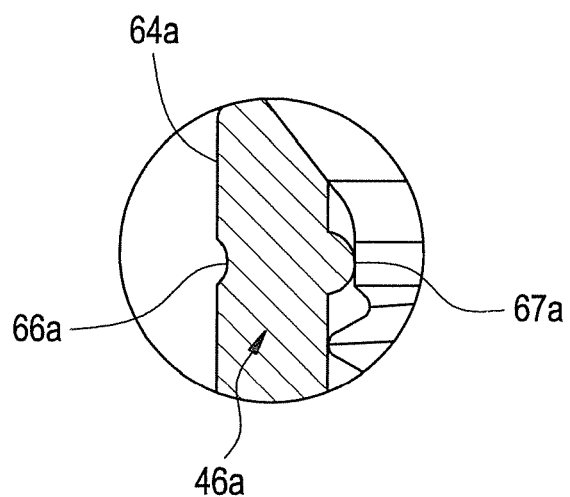
FIG. 15 shows a close up, detailed view of a circled portion of FIG. 14.

FIG. 14 shows a preferred embodiment of sleeve 46 (identified as 46a in FIG. 14), wherein a retention feature is provided, specifically three depressions 66a, equally spaced, on the external surface 64a of the sleeve 46a, and an internal lip or protrusion 67a. The retention feature provides that the bolt 20 and sleeve 46a can be supplied such that the sleeve 46a is retained on the bolt 20, ready for installation in a differential case and ring gear, and this is preferred. FIG. 15 shows a close up, detailed view of a circled portion of FIG. 14.

Figure 16:
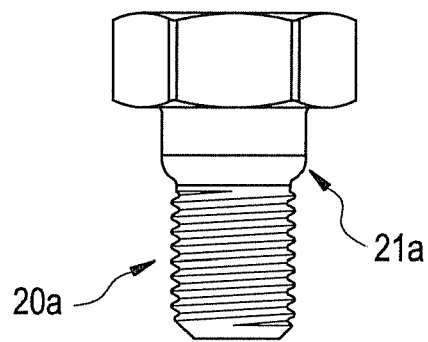
FIG. 16 shows a preferred bolt for use with the present invention.

FIG. 16 shows a preferred bolt 20a for use with the present invention. The bolt 20a includes a radius or rounded portion 21a. The purpose of the radius 21a is to provide a smoother transition when entering the sleeve 46, and to decrease the load required to extrude the sleeve 46.

While embodiments of the present invention are shown and described, it is envisioned that those skilled in the art may devise various modifications of the present invention without departing from the spirit and scope of the disclosure.

What is claimed is:

1. A method of forming a bolted joint to secure a first structure having an aperture provided therethrough defining an aperture wall to a second structure having a treaded bore, the aperture of the first structure having a width that is larger than a width of the threaded bore of the second structure, said method comprising the steps of:

providing a bolt comprising a head and a shaft portion extending from said head, said head having a width which is larger than the width of the aperture of the first structure, said shaft portion comprising a threaded portion and a non-threaded portion which is disposed between said head and said threaded portion, said non-threaded portion having a first portion proximate said head, a second portion proximate said threaded portion, and a shoulder provided between said first and second portions, said first portion having a cylindrical configuration and having a constant outer diameter from proximate said head to said shoulder;

providing a sleeve having first and second opposite ends and a throughbore extending therethrough from said first end to said second end, said throughbore defining a constant inner diameter from proximate said first end to proximate said second end, said constant inner diameter being larger than a width of said second portion and larger than a width of said threaded portion, said consist inner diameter being smaller than said constant outer diameter of said first portion;

inserting said sleeve into the aperture of the first structure until said second end of said sleeve abuts against a face of the second structure;

inserting said threaded portion of said shaft portion of said bolt through said throughbore of said sleeve;

simultaneously threading said threaded portion into the threaded bore of the second structure until said head contacts the first structure, and deforming a first portion of said sleeve with said shoulder until said head contacts the first structure, said deformation of said first portion of said sleeve providing a zero-clearance fit between said first portion of said non-threaded portion, said first portion of said sleeve and the aperture wall of the first structure and further providing space between a second non-deformed portion of said sleeve and said second portion of said non-threaded portion.

2. The method as defined in claim 1, further comprising the step of providing an adhesive on at least a portion of said threaded portion.

3. The method as defined in claim 1, wherein said head has a hexagon profile.

4. The method as defined in claim 1, wherein said shoulder deforms said sleeve by cold forming said sleeve.

5. The method as defined in claim 1, wherein said shoulder is tapered.

6. The method as defined in claim 1, wherein said shoulder is rounded.

7. The method as defined in claim 1, wherein the first structure comprises a differential case and the second structure comprises a ring gear.

8. The method defined in claim 1, wherein said sleeve is beveled where said throughbore meets said first and second ends of said sleeve.

9. The method as defined in claim 1, wherein said threaded portion is threaded into the threaded bore of the second structure until said head directly contacts the first structure.

10. The method as defined in claim 1, wherein said first portion of said sleeve which is deformed is positioned within the aperture of the first structure.

11. A method of forming a bolted joint to secure a first structure having an aperture provided therethrough defining an aperture wall to a second structure having a threaded bore, the aperture of the first structure having a width that is larger than a width of the threaded bore of the second structure, said method comprising the steps of:

providing a bolt comprising a head and a shaft portion extending from said head, said head having a width which is larger than the width of the aperture of the first structure, said shaft portion comprising a threaded portion and a non-threaded portion which is disposed between said head and said threaded portion, said non-threaded portion having a first portion proximate said head, a second portion proximate said threaded portion, and a shoulder provided between said first and second portions, said first portion having a cylindrical configuration and having a constant outer diameter from proximate said head to said shoulder;

providing a sleeve having first and second opposite ends and a throughbore extending therethrough from said first end to said second end, said throughbore defining a constant inner diameter from proximate said first end to proximate said second end, said constant inner diameter being larger than a width of said second portion and larger than a width of said threaded portion, said constant inner diameter being smaller than said constant outer diameter of said first portion, said sleeve further having a protrusion extending into said constant inner diameter of said throughbore;

inserting said threaded portion through said throughbore of said sleeve until said protrusion abuts against at least one of said second portion of said non-threaded portion and said threaded portion proximate to the connection of said non-threaded portion to said threaded portion in order to secure said sleeve to said shaft portion of said bolt which provides a bolt/sleeve assembly;

inserting said threaded portion of said bolt/sleeve assembly through the aperture of the first structure;

threading said threaded portion into the threaded bore of the second structure until said second end of said sleeve abuts against a face of the second structure; and simultaneously threading said threaded portion into the threaded bore of the second structure until said head contacts the first structure, and deforming a first portion of said sleeve with said shoulder until said head contacts the first structure, said deformation of said first portion of said sleeve providing a zero-clearance fit between said first portion of said non-threaded portion, said first portion of said sleeve and the aperture wall of the first structure and further providing space between a second non-deformed portion of said sleeve and said second portion of said non-threaded portion.

12. The method as defined in claim 11, further comprising the step of providing an adhesive on at least a portion of said threaded portion.

13. The method as defined in claim 11, wherein said head has a hexagon profile.

14. The method as defined in claim 11, wherein said shoulder deforms said sleeve by cold forming said sleeve.

15. The method as defined in claim 11, wherein said shoulder is tapered.

16. The method as defined in claim 11, wherein said shoulder is rounded.

17. The method as defined in claim 11, wherein the first structure comprises a differential case and the second structure comprises a ring gear.

18. The method as defined in claim 11, wherein said sleeve is beveled where said throughbore meets said first and second ends of said sleeve.

19. The method as defined in claim 11, wherein said sleeve has an outer surface and a plurality of depressions which are disposed on said outer surface.

20. The method as defined in claim 11, wherein said threaded portion is threaded into the threaded bore of the second structure until said head directly contacts the first structure.

21. The method as defined in claim 11, wherein said first portion of said sleeve which is deformed is positioned within the aperture of the first structure.

22. A bolted joint which secures a first structure to a second structure, said bolted joint comprising:

a first structure having an aperture provided therethrough defining an aperture wall;

a second structure having a threaded bore, said threaded bore being in alignment with said aperture of said first structure, said threaded bore having a width which is smaller than a width of said aperture of said first structure;

a bolt having
  a head having a width which is larger than said width of said aperture of said first structure, said head being in abutting engagement with a face of said first structure, and
  a shaft portion extending from said head, said shaft portion having a threaded portion and a non-threaded portion which is disposed between said head and said threaded portion, said non-threaded portion having a first portion proximate said head, a second portion proximate said threaded portion, and a shoulder provided between said first and second portions, said first portion having a cylindrical configuration and having a constant outer diameter from proximate said head to said shoulder, said threaded portion being in threaded engagement with said threaded bore of said second structure; and a sleeve having first and second opposite ends and a throughbore extending therethrough from said first end to said second end, said sleeve being positioned within said aperture of said first structure with said second end thereof being in abutting engagement with a face of said second structure, said sleeve having a first portion which is deformed and a second portion which is non-deformed, said deformed first portion of said sleeve being in contact with said first portion of said non-threaded portion and said aperture wall of said first structure to define a zero-clearance fit therebetween, said non-deformed second portion of said sleeve being spaced from said second portion of said non-threaded portion.

23. The bolted joint as defined in claim 22, further comprising an adhesive on at least a portion of said threaded portion.

24. The belted joint as defined in claim 22, wherein said head has a hexagon profile.

25. The bolted joint as defined in claim 22, wherein said deformed first portion of said sleeve was deformed by cold forming.

26. The bolted joint as defined in claim 22, wherein said shoulder is tapered.

27. The bolted joint as defined in claim 22, wherein said shoulder is rounded.

28. The bolted joint as defined in claim 22, wherein said first structure comprises a differential case and said second structure comprises a ring gear.

29. The bolted joint as defined in claim 22, wherein said sleeve is entirely positioned within said aperture of said first structure.

* * * * *

UNITED STATES PATENT AND TRADEMARK OFFICE
CERTIFICATE OF CORRECTION

| | |
|---|---|
| PATENT NO. | : 7,717,659 B2 |
| APPLICATION NO. | : 11/462433 |
| DATED | : May 18, 2010 |
| INVENTOR(S) | : Benjamin N. Lang |

It is certified that error appears in the above-identified patent and that said Letters Patent is hereby corrected as shown below:

On the Title Page Item (73) Assignee: "Acumet Intellectual Properties, LLC," should be
-- Acument Intellectual Properties, LLC, --

Column 3, Line 61 "a treaded bore," should be -- a threaded bore, --

Column 4, Line 15 "said consist" should be -- said constant --

Column 6, Line 14 "structure ,said" should be -- structure, said --

Column 6, Line 50 "The belted joint" should be -- The bolted joint --

Signed and Sealed this
First Day of May, 2012

David J. Kappos
*Director of the United States Patent and Trademark Office*